3,086,016
PROCESS FOR PRODUCTION OF CYCLIC TETRAZINES

Richard M. Hunt, Butler, and William V. Hough, Valencia, Pa., assignors to Callery Chemical Company, Pittsburgh, Pa., a corporation of Pennsylvania
No Drawing. Filed Mar. 21, 1961, Ser. No. 97,387
3 Claims. (Cl. 260—241)

This invention relates to N-dialkylhexahydro-1,2,4,5-tetrazines and to a method for producing them.

The basis for this invention is our discovery that methylene halides react with mono(lower alkyl)hydrazines to produce cyclic tetrazines of the empirical formula $(RN_2HCH_2)_2$, where R is a lower alkyl group derived from the lower alkyl hydrazine used. It has further been found that the products thus formed have a cyclic structure corresponding to the structural formula

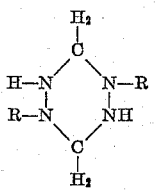

Such compounds are called N-di(lower alkyl)hexahydro-1,2,3,5-tetrazines. It may be noted that the position of the alkyl groups in the above formula may vary; that is the alkyl groups may be attached to either the nitrogens in the 1,4 positions or the nitrogens in the 1,5 positions. The position of these groups does not affect the composition or uses of the compound.

The stoichiometry of the reaction by which these compounds are produced corresponds to that shown in the equation $$6RN_2H_3 + 2CH_2X_2 \rightarrow 4RN_2H_4X + (CH_2NHNR)_2$$

where R is a lower alkyl group and X is a halogen.

The reaction described above takes place to produce the tetrazine using any methylene halide in conjunction with any mono(lower alkyl)hydrazine. Thus, for example, N-dimethylhexahydro-1,2,4,5-tetrazine is produced from the reaction of methylene bromide with monomethylhydrazine, N-diethylhexahydro-1,2,4,5-tetrazine is produced by the reaction of methylene chloride with monoethylhydrazine and N-dipropylhexahydro-1,2,4,5-tetrazine is produced from the reaction of methylene chloride with monopropylhydrazine.

The conditions under which the reaction to produce the tetrazine is carried out are not critical to operability of the method. Thus, ordinary conditions of temperature and pressure, i.e., those ambient conditions such as temperatures of 20 to 30° C., are satisfactory, although in some cases it may be desirable to moderately heat the reaction mixture in order to accelerate the reaction. Similarly, the reaction takes place satisfactorily in the absence of a solvent, but mixing of the reactants is facilitated by the presence of a solvent. Any inert solvent, such as ethanol or benzene, can be used, but one solvent which we have found particularly useful is diethyl ether, since the use of this solvent permits recovery of the product by simply filtering the solid by-products and crystallizing the tetrazine from the ether solution. However, if no solvent is used or the reaction is carried out in other solvents, recovery is easily achieved by other conventional techniques. For instance, extraction with ether or solvent can be used as the recovery method, in which case the crude reaction mixture is simply slurried with the extractive solvent, filtered and the tetrazine product then crystallized from the solution.

In one test which exemplifies the presently preferred method and practice of our invention, 1.182 mols of monomethyl hydrazine and 0.118 mol of methylene chloride were mixed with 100 milliliters of ethyl ether in a glass reaction flask. The mixture was maintained at 34° C. for several hours; it then was allowed to cool and an additional 200 milliliters of ether was added. The ether solution was decanted away from the residue and concentrated. Upon concentration of this solution a precipitate formed which was collected and recrystallized. This product was then analyzed by chemical analysis, X-ray diffraction analysis and infra-red examination. By such means, the compound was identified as N-dimethylhexahydro-1,2,4,5-tetrazine.

To exemplify the type of analytical data obtained from N-di(lower alkyl)hexahydro-1,2,4,5-tetrazines prepared in the above manner, data obtained from a typical analysis are set forth in Table I below:

TABLE I
*Typical Analysis of N-Dimethylhexahydro-1,2,4,5-tetrazine*

|  |  | Theory | Found |
|---|---|---|---|
| N—N | mmol/g | 17.25 | 17.55 |
| C | percent | 41.3 | 40.1 |
| N | do | 48.3 | 49.9 |
| H | do | 10.4 | 10.5 |
| Mol. Wt | | 118.4 | 116 |

Unique X-ray diffraction patterns were obtained from our new compounds and were among analytical techniques used for their identification. Thus, for example, the product produced in the example described above has significant X-ray diffraction lines as set forth in Table II.

TABLE II
*X-Ray Data: N-Dimethylhexahydro-1,2,4,5-tetrazine*

| dA°: | I |
|---|---|
| 6.40 | s |
| 4.50 | s |
| 3.95 | s |
| 3.60 | s |
| 3.08 | m |
| 2.45 | m |
| 2.20 | m |

The compounds of our invention have several uses, e.g., as fuel components and fuel additives. For instance, N-di(lower alkyl)hexahydro-1,2,4,5-tetrazines are useful ignition improvers for diesel fuels; the addition of relatively small amounts of these compounds, i.e., less than 0.1% by weight, to conventional diesel fuels improves the ignition characteristics of the fuel. They are also strong reducing agents and can be used in the same manner as alkyl hydrazines in applications wherein the reducing power of alkyl hydrazines is utilized.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:

1. A method of producing N-di(lower alkyl)hexahydro-1,2,4,5-tetrazine which comprises reacting a methylene halide with a mono(lower alkyl)hydrazine and recovering the N-di(lower alkyl)hexhydro-1,2,4,5-tetrazine thus formed.

2. A method according to claim 1 in which the reaction is carried out in an inert solvent.

3. A method of producing N-dimethylhexahydro-1,2,4,5-tetrazine which comprises reacting methylene chloride with monomethylhydrazine in diethyl ether and recovering the N-dimethylhexahydro-1,2,4,5-tetrazine thus formed.

References Cited in the file of this patent

Erickson et al.: The 1,2,3 and 1,2,4 Triazines, Tetrazines and Pentazines, from the series of Monographs entitled "The Chemistry of Heterocyclic Compounds," page 181 (Interscience) (1956).